United States Patent [19]

Norcia

[11] Patent Number: 4,967,884
[45] Date of Patent: Nov. 6, 1990

[54] AUTOMATIC CLUTCH ENGAGEMENT SYSTEM

[75] Inventor: John A. Norcia, Columbia, S.C.

[73] Assignee: Ram Automotive of South Carolina, Inc., Columbia, S.C.

[21] Appl. No.: 426,429

[22] Filed: Oct. 25, 1989

[51] Int. Cl.$^5$ .................. B60K 41/24; F16D 67/04
[52] U.S. Cl. .......................... 192/13 A; 192/85 CA; 192/103 F; 192/0.072
[58] Field of Search ............ 192/85 CA, 13 A, 103 F, 192/0.072, 0.094, 12 C

[56] References Cited

U.S. PATENT DOCUMENTS 4,664,240  5/1987  Majima et al. ................. 192/85 CA
4,779,713 10/1988  Tomala et al. ................. 192/85 CA

FOREIGN PATENT DOCUMENTS 8200184  1/1982  World Int. Prop. O. ..... 192/85 CA

Primary Examiner—Richard Lorence
Assistant Examiner—Andrea Pitts
Attorney, Agent, or Firm—Michael Sand Co.

[57] ABSTRACT

An improved hydraulic clutch engagement system for use in a drag racing motor vehicle provides automatic engagement of the clutch for launching the car at the start of a race, without sacrificing manual control of the clutch necessary for power staging the car at the starting line prior to the race. A clutch assembly is movable between engaged and disengaged positions, wherein the car is driven when the clutch assembly is engaged. A slave cylinder is mounted adjacent to the clutch assembly. Main and return fluid lines extend between and flowingly connect the slave cylinder to a master cylinder. A pedal is operatively connected to the master cylinder for manually controlling the clutch assembly through displacement of a hydraulic fluid. A normally-closed solenoid valve is incorporated into the return line. A push button activated control device automatically electrically controls movement of the solenoid valve between its closed and open positions, and simultaneously controls locking and release of the vehicle brakes, respectively. Before the race, the brakes are locked and the clutch is disengaged due to the presence of hydraulic fluid in the slave cylinder caused by depressing the clutch pedal. When the race start is signalled, the push button is released which automatically disengages the brakes and opens the solenoid valve to release the fluid through the return line, which automatically relieves the hydraulic pressure in the slave cylinder causing the clutch assembly to engage, without removing manual control of the clutch assembly from the vehicle driver.

15 Claims, 3 Drawing Sheets

AUTOMATIC CLUTCH ENGAGEMENT SYSTEM

BACKGROUND OF THE INVENTION

1. Technical Field

The invention relates to clutch systems and in particular to an automotive clutch system. More particularly, the invention relates to such an automotive clutch system in which the clutch is automatically engaged and is maintained in control of the driver for launch of a drag racing motor vehicle, without blocking manual control of the clutch during power staging of the vehicle at the starting line prior to the start of a race.

2. Background Information

Drag racing of motor vehicles is a sport which has been popular for many years and continues to be popular today. Traditionally, most motor vehicles used in drag racing have manual transmissions rather than automatic transmissions. Therefore, a clutch assembly is required for causing movement of the vehicles having manual transmissions.

Prior to the start of a drag race, a driver typically sees a series of sequentially illuminated lights, usually a red light, a yellow light, and then a green light which signals the start of the race. Each light is illuminated at 0.400 second intervals. Thus, it is critical that the driver reacts to the green light in a timely manner in order to have a good start and be competitive in the race. In a conventional clutch engagement system, launching the vehicle at the start signal involves various foot and leg movements in order to release the clutch and brake pedals for engaging the clutch and unlocking the brakes, respectively.

In addition, when the car is positioned at the starting line before the start of a race, the driver must apply as much power as possible to its driveline without causing the car to move to ensure optimum performance of the car during the race. This technique is called "power staging", and is achieved by locking the brakes of the car and slightly or partially engaging the clutch. This technique removes the slack from the driveline and suspension of the car and poises the car for maximum power application and acceleration. This technique is similar to preventing a car from rolling backward down a hill by using the clutch, and also is similar to engaging the brakes on an automatic transmission car and applying the throttle, thereby preloading the driveline and suspension. Thus, it is apparent that a driver must have precise manual control of the clutch in order to utilize this power staging technique.

The closest known prior art to the present invention is an automatic push button or switch clutch engagement system marketed by McLeod Industries of Anaheim, Calif. This system includes a normally open solenoid valve incorporated into the hydraulic control line between the master and slave cylinders. In operation, the driver of the car depresses a clutch pedal to displace hydraulic fluid from the master to the slave cylinder for releasing the clutch, switches "on" the solenoid valve which closes and blocks the return of hydraulic fluid to the master cylinder, and then releases the clutch pedal. The valve thus maintains hydraulic pressure in the slave cylinder so that the clutch remains released. When the driver decides to engage the clutch at the start of a race, he merely switches the solenoid valve "off" by a push button switch which opens the valve to release the pressure in the slave cylinder by allowing the hydraulic fluid to return to the master cylinder in a normal fashion. However, it is important to note that when the solenoid valve of the McLeod clutch engagement system is closed, the single hydraulic control line connecting the master and slave cylinders is blocked so that the driver loses manual control of the clutch. Thus, although the McLeod system provides for effective automatic clutch engagement, it interferes with manual control of the clutch which prevents the driver from utilizing the important power staging technique.

Thus, the need exists for an automotive clutch system which automatically engages the clutch of a motor vehicle without blocking manual control of the clutch and that the driver has complete control of the clutch at all times.

SUMMARY OF THE INVENTION

Objectives of the invention include providing an automatic clutch engagement system in which the clutch is automatically engaged for launch of a motor vehicle in a race, without blocking manual control of the clutch during power staging of the vehicle at the starting line prior to the start of a drag race, and providing the driver with complete control of the clutch at all times except for a very short period of time at the initial start of the race.

Another objective of the present invention is to provide such an automatic clutch engagement system which substantially improves the reaction times of drag racing drivers to the light signal which indicates the start of a race.

A further objective of the present invention is to provide such a clutch engagement system which is automatically actuated by a single push button switch which also simultaneously controls release of the brakes of the vehicle.

Still another objective of the invention is to provide such an automatic clutch engagement system which is relatively inexpensive, safe, easy to operate, and which is durable in use and is simple to maintain and repair.

These objectives and advantages are obtained by the clutch system of the present invention, the general nature of which may be stated as a clutch system for coupling an engine of a vehicle with the drive shaft of the vehicle including a hydraulic clutch, a slave cylinder operatively connected to the clutch for controlling said clutch to engage and disengage the vehicle engine with and from the drive shaft, a manually actuated master cylinder hydraulically connected to the slave cylinder along a first hydraulic path for manually controlling the slave cylinder to manually control the engagement and disengagement of the clutch, a second hydraulic path between the manually actuated master cylinder and the slave cylinder, valve means in the second hydraulic path, and switch means for opening the valve means for a short duration of time sufficient to permit the flow of fluid from the slave cylinder along the second hydraulic path for automatically actuating the slave cylinder to actuate the hydraulic clutch and engage the engine with the drive shaft without loss of manual control of the master cylinder and hydraulic clutch along the first fluid path except for the duration of time when the valve means is opened.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
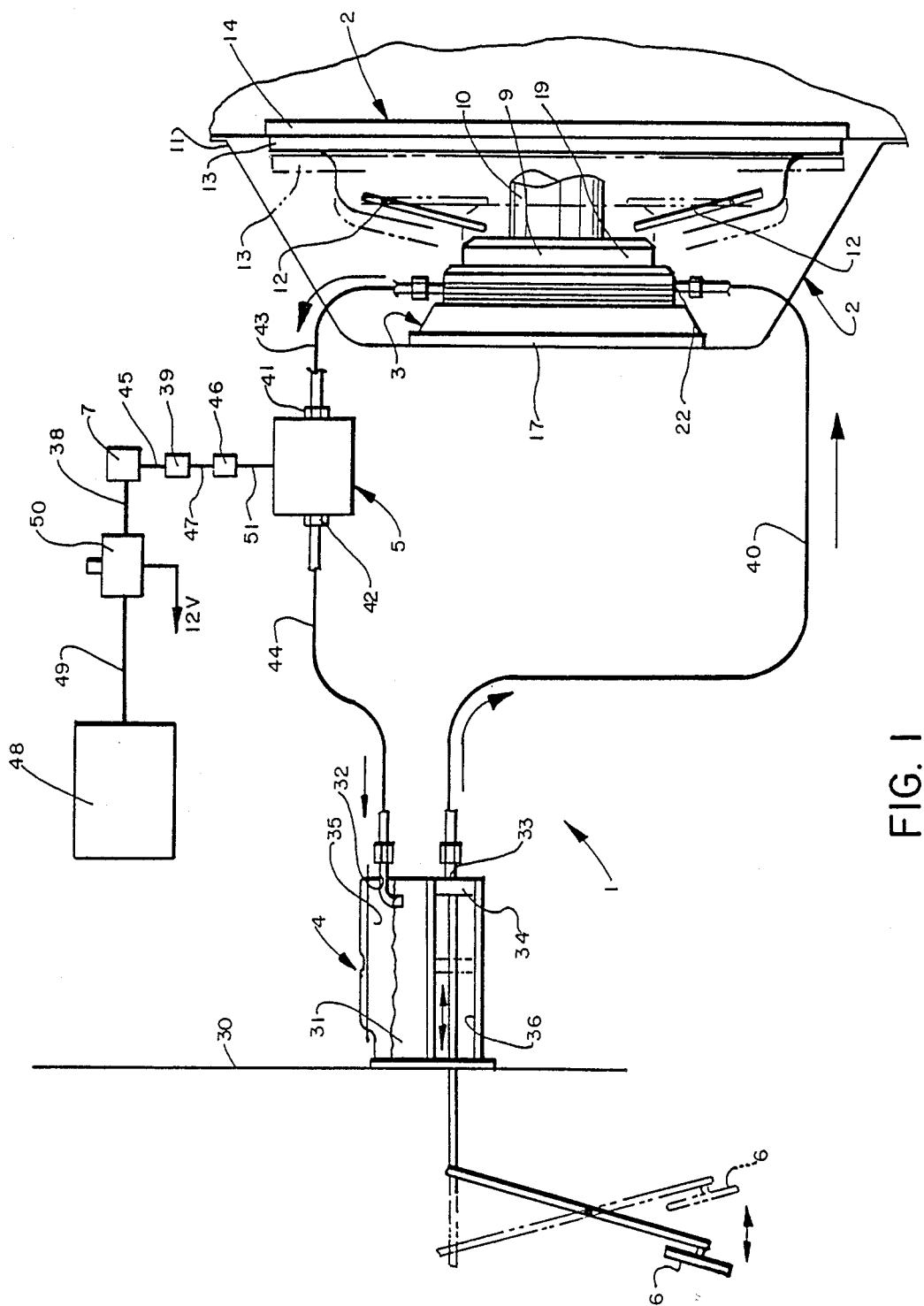
FIG. 1 is a diagrammatic view of the improved automatic clutch engagement system of the present invention.

The improved automatic clutch engagement system of the present invention is indicated generally at 1, and is diagrammatically shown in FIG. 1. System 1 is of the type intended for use in a drag racing motor vehicle to improve a driver's reaction time to a signal starting a race. The main components of automatic clutch engagement system 1 include a clutch assembly 2, a slave cylinder 3, a master cylinder 4, a solenoid valve 5, a clutch pedal 6, and a control circuit 7.

Clutch assembly 2 connects and disconnects a driving flywheel (not shown) to and from a driven transmission main shaft 10 in a manner well-known in the art. When clutch assembly 2 connects the flywheel to shaft 10, the vehicle is driven. Clutch assembly 2 is mounted within a bellhousing 11 and includes a pair of clutch levers 12, a pressure plate 13, and a clutch disc 14. Levers 12 are movable for moving pressure plate 13 into and out of engagement with clutch disc 14, which in turn connects and disconnects the flywheel to and from main shaft 10. The above description of clutch assembly 2 merely is illustrative of the general construction and operation of one type of basic clutch assembly. It is understood that other types of clutch assemblies could be employed in system 1 without effecting the concept of the invention.

Figure 2:
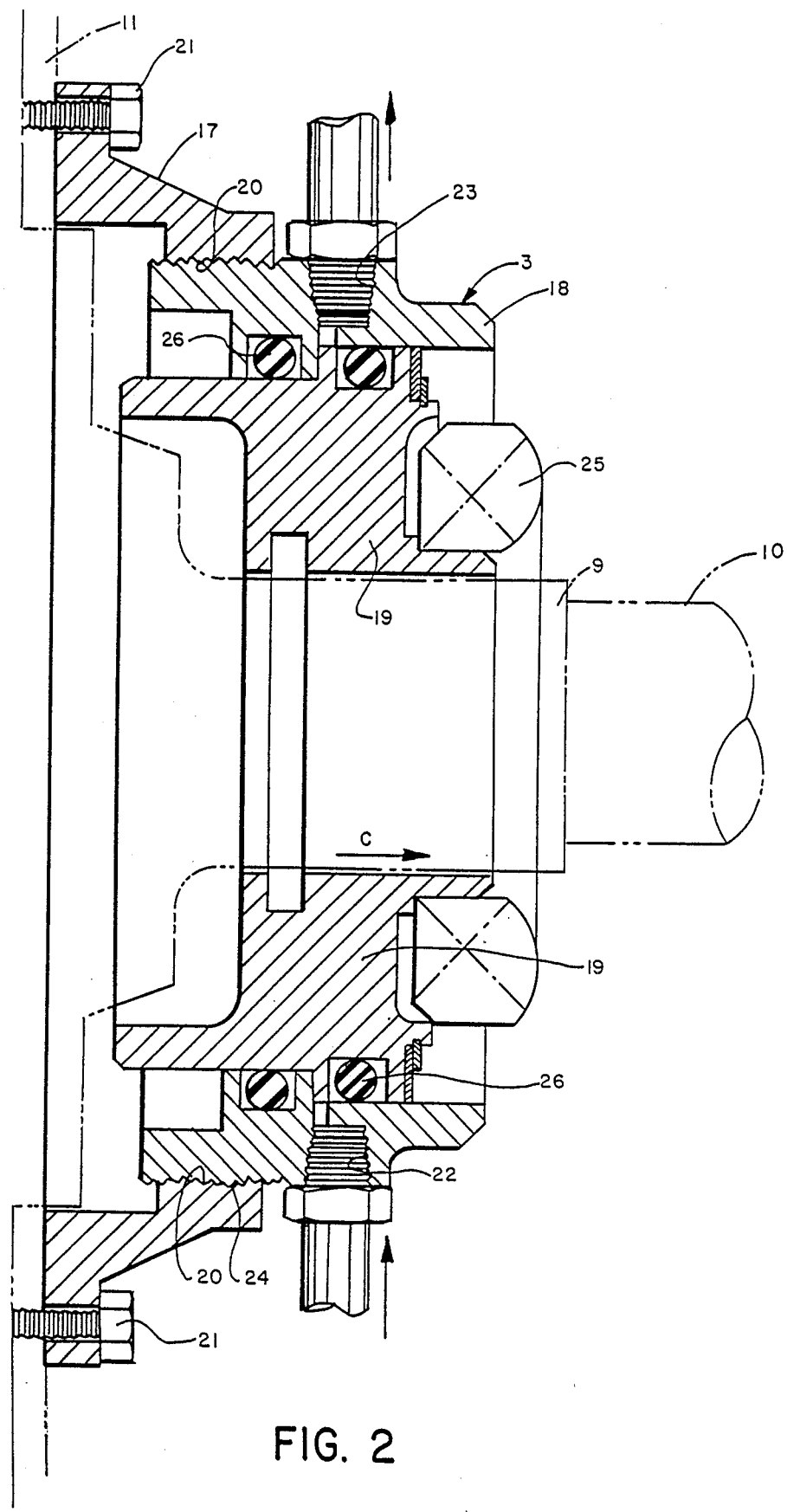
FIG. 2 is an enlarged longitudinal sectional view of the slave cylinder of the system.

Slave cylinder 3 is mounted within bellhousing 11 adjacent to clutch assembly 2 and surrounds a transmission collar 9 which in turn surrounds the portion of main shaft 10 which passes through slave cylinder 3 (FIGS. 1 and 2). Slave cylinder 3 includes an annular base 17, a cylinder 18 and a piston 19. Annular base 17 is formed with a threaded inside diameter 20, and is mounted on bellhousing 11 by bolts 21. Cylinder 18 is formed with a fluid inlet port 22 and a fluid outlet port 23. Cylinder 18 is mounted on base 17 by the threadable engagement of outside diameter 24 of cylinder 18 with inside diameter 20 of base 17. Piston 19 is generally annular-shaped and is slideably mounted within cylinder 18 by a bearing 25. A pair of "O"-rings 26 are mounted between cylinder 18 and piston 19 to prevent fluid leaks from slave cylinder 3 during its operation.

Master cylinder 4 is mounted on a firewall 30 of the vehicle and contains a suitable hydraulic fluid 31 (FIG. 1). Master cylinder 4 is of a usual construction and includes a reservoir 35 and a cylinder 36 having a plunger 34 slideably mounted therein, and is formed with a fluid inlet port 32 and a fluid outlet port 33 in the reservoir and cylinder. Pedal 6 is operatively connected to plunger 34, for manual displacement of hydraulic fluid 31 between master cylinder 4 and slave cylinder 3, as described below in the detailed description of the operation of clutch engagement system 1. A tube or conduit 40 extends between outlet port 33 of master cylinder 4 and inlet port 22 of slave cylinder 3.

Figure 3:
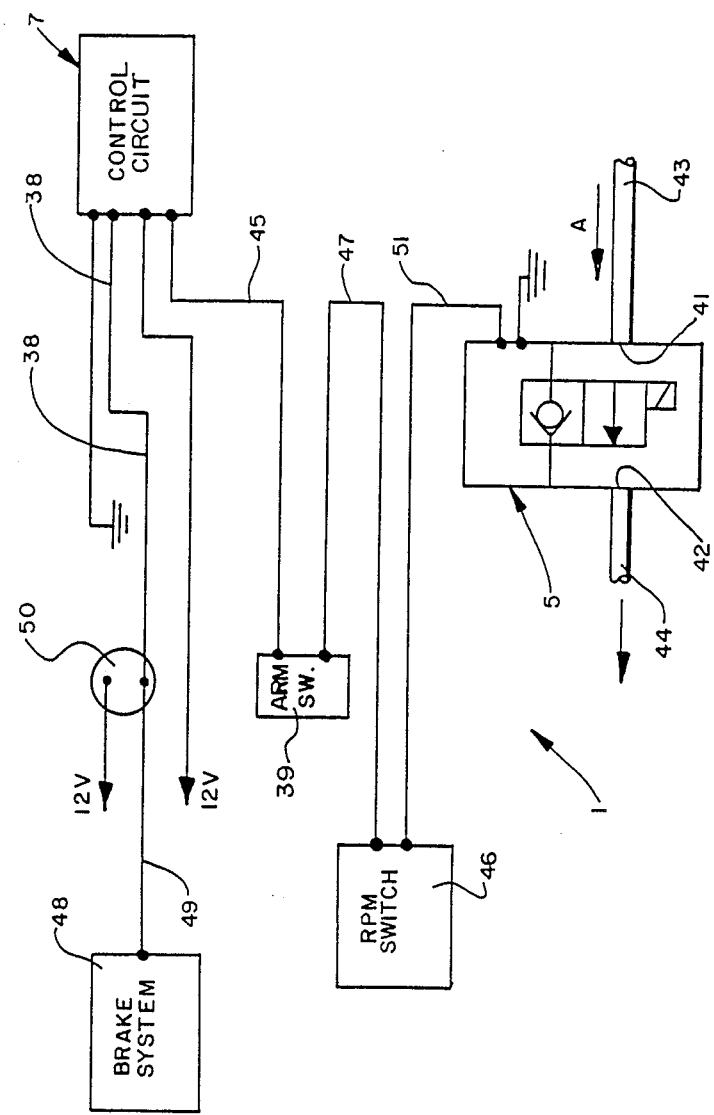
FIG. 3 is a schematic diagram of the electrical system which automatically controls opening and closing of the solenoid valve of the clutch engagement system, and release and locking of the brakes of the motor vehicle.

In accordance with one of the main features of the present invention, solenoid valve 5 is formed with a fluid inlet port 41 and a fluid outlet port 42 (FIGS. 1 and 3). Valve 5 preferably is a solenoid-operated, two-way, normally-closed poppet-type hydraulic valve of the type manufactured by HydraForce, Inc., a JSB Company, of Northbrook, Ill., and identified by Model No. SV 10-20. A conduit 43 extends between outlet port 23 of slave cylinder 3 and inlet port 41 of solenoid valve 5. Another conduit 44 extends between outlet port 42 of solenoid valve 5 and inlet port 32 of master cylinder 4.

Solenoid valve 5 is energized by control circuit 7 which is electrically connected to a push button switch 50 by electrical conductor 38. Button 50 preferably will be mounted on the gearshift lever of the vehicle (FIGS. 1 and 3). Control circuit 7 preferably includes a pair of relays and a capacitor. One of the relays energizes the capacitor which in turn energizes the second relay upon discharge to provide the $\frac{1}{2}$ second actuation of solenoid valve 5 as discussed further below. Preferably a manually actuated arming switch 39 is connected to control circuit 7 by conductor 45 and is connected to a switch 46 by another conductor 47. Arming switch 39 is usually actuated by the driver shortly before approaching the starting line to place the clutch control system in an operative condition. Switch 46 is controlled by the engine speed and is automatically energized upon the engine reaching a predetermined speed. Switch 46 will also deenergize the entire control system should the engine speed drop below the preset minimum to provide enhanced safety for the clutch control system. Switch 46 is connected to solenoid valve 5 by conductor 51. Push button switch 50 also is electrically connected to the brake system indicated at 48 (FIG. 3) of the vehicle, by conductor 49 and controls the release and locking of the brakes thereof. If desired, various types of timing circuits may be used for circuit 7 without effecting the concept of the invention.

Improved automatic clutch engagement system 1 of the invention operates and is used in the following manner. Prior to the start of a drag race, the driver of the vehicle "power stages" his or her vehicle as follows. The driver arms the system by actuating switch 39 and the car is moved to the starting line. Upon the engine reaching a preset speed switch 46 will be actuated automatically arming the entire system. The driver then applies as much power to the driveline of the car as possible, without allowing the car to move, by locking the brakes by depressing push button 50 and partially engaging clutch assembly 2 by foot movement of pedal 6. This technique removes the slack from the driveline and suspension and poises the car at the starting line for maximum power application and acceleration. It is important to note that manual control of clutch assembly 2 through pedal 6 must be maintained to properly accomplish this technique.

When the drag racing car is power staged and poised at the starting line, a series of usually vertically arranged lights on a pole are sequentially illuminated in descending order, starting with a red light, then a yellow light and then a green light which signals the start of the race. Since these lights are illuminated at 0.400 second intervals, driver reaction to the illumination of the green light is critical in order to have a good start and be competitive in the race.

The present invention significantly improves driver reaction time to illumination of the green or "go" light, and unlike the previously described prior art automatic clutch engagement system, does so without blocking the driver's manual control of the clutch assembly 5 which is necessary for performing the important power staging technique discussed above. As the car is poised and power staged at the starting line, clutch pedal 6 is maintained in the depressed position as shown in dot-dash lines in FIG. 1, so that plunger 34 displaces hydraulic fluid 31 from cylinder 36 of master cylinder 4, through conduit 40, and into slave cylinder 3 through inlet port 22 of cylinder 18. Hydraulic pressure created by the passage of fluid 31 through port 22 causes extension of piston 19 in the direction of arrow "C" (FIG. 2) which engages clutch levers 12, which in turn move pressure plate 13 out of engagement with clutch disc 14 preventing the car from moving.

Upon illumination of the green or "go" light on the light pole, the driver releases normally open push button switch 50 which simultaneously disengages the brakes through power supply line 49 and causes control circuit 7 to energize solenoid valve 5 as described previously above for approximately one-half second by the momentary capacitor discharge pulse. This causes normally closed valve 5 to open allowing hydraulic fluid to flow out of slave cylinder 3 in the direction of arrow "A" (FIG. 1) through outlet port 23 of cylinder 18, through conduit 43, through open valve 5, and through conduit 44 and back into reservoir 35 of master cylinder 4 through inlet port 32. This movement of fluid 31 relieves the hydraulic pressure in the slave cylinder, so that piston 19 can return to its retracted position as shown in full lines in FIG. 1, whereby clutch levers 12 are released and pressure plate 13 engages clutch disc 14 which in turn connects the flywheel of the car to main shaft 10 causing the car to launch from the starting line. Manual control of clutch assembly 2 is only momentarily lost for the approximately ½ second period during which solenoid valve 5 is being energized, and then is regained after launch so that subsequent gear changes can be made during the race. Direct manual control of the clutch assembly also is preferable for safety reasons.

Again, one of the important features of the present invention is that a solenoid valve is incorporated into a return or bleed line, rather than the main line or conduit 40 connecting the master cylinder to the slave cylinder, for effecting automatic engagement of the clutch assembly. This system thus enables the driver to maintain manual control of the clutch assembly at all times prior to and during a drag race, except for the approximately one-half second period when the solenoid valve is energized and the clutch assembly is engaged to launch the vehicle at the start of the race.

In summary, the improved automatic clutch engagement system of the present invention provides for automatic engagement of a clutch assembly for launching a vehicle at the start of a drag race, without blocking manual control of the clutch assembly during power staging prior to the start of a drag race or during the race. This system consistently improves the reaction times of drag racing drivers to the light signal which indicates the start of the race, making the car and driver combination more competitive. The clutch assembly is automatically engaged merely by release of a push button switch, which simultaneously releases the brakes of the car at the start of a race, which is quicker and easier than the foot and leg movements normally required to disengage the brakes and engage the clutch. The automatic clutch engagement system is relatively inexpensive, safe, easy to operate, durable in use, and simple to maintain and repair.

Accordingly, the automatic clutch engagement system of the present invention is simplified, provides an effective, safe, inexpensive, and efficient system which achieves all the enumerated objectives, provides for eliminating difficulties encountered with prior systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved automatic clutch engagement system is constructed and used, the characteristics of the construction, and the advantageous, new and useful results obtained; the new and useful structures, devices, elements, arrangements, parts and combinations, are set forth in the appended claims.

I claim:

1. An automatic clutch engagement system for use in a motor vehicle, said system including:
   (a) a clutch assembly having engaged and disengaged positions, wherein the motor vehicle is driven when the clutch assembly is in the engaged position;
   (b) a slave cylinder formed with a fluid inlet port and a fluid outlet port mounted adjacent to the clutch assembly;
   (c) a piston slideably mounted in the slave cylinder and moveable between retracted and extended positions for moving the clutch assembly between the engaged and disengaged positions, respectively;
   (d) a master cylinder formed with a fluid inlet port and a fluid outlet port and having a plunger slideably mounted therein;
   (e) a first conduit extending between the outlet port of the master cylinder and the inlet port of the slave cylinder;
   (f) an electromechanical valve formed with a fluid inlet port and a fluid outlet port and being movable between a closed position and an open position;
   (g) a second conduit extending between the outlet port of the slave cylinder and the inlet port of the valve;
   (h) a third conduit extending between the outlet port of the valve and the inlet port of the master cylinder;
   (i) manually actuated pedal means operatively connected to the plunger of the master cylinder, for displacing an hydraulic fluid between the master cylinder and the slave cylinder, wherein manual movement of the pedal means between a depressed position and a released position causes displacement of the hydraulic fluid through the first conduit from the master cylinder into the slave cylinder and from the slave cylinder into the master cylinder, respectively, and corresponding movement of the piston between the extended and the retracted positions for moving the clutch assembly between the disengaged and engaged positions; and (j) switch means electrically connected to the valve for automatically controlling movement of the valve between the closed and open positions, so that upon energizing the valve by the switch means when the hydraulic fluid is present in the slave cylinder and the clutch assembly is disengaged, the valve is moved from the closed position to the open position, and the hydraulic fluid subsequently flows out of the slave cylinder, through the second conduit, the valve, and the third conduit, and into the master cylinder, thereby automatically relieving hydraulic pressure in the slave cylinder and causing the piston to return to the retracted position, allowing the clutch assembly to move to the engaged position, generally without blocking manual control of the clutch assembly by the pedal means.

2. The system defined in claim 1 in which the electromechanical valve is a solenoid-operated, two-way, poppet-type hydraulic valve; and in which the valve is normally closed in a direction of flow from the slave cylinder to the master cylinder.

3. The system defined in claim 1 in which the switch means is a push button-activated control device.

4. The system defined in claim 1 in which the switch means is electrically connected to a brake system of the vehicle, so that upon actuation of the switch means the brake system is disengaged simultaneously with engagement of the clutch assembly.

5. An automatic clutch engagement system including:
(a) a clutch assembly having engaged and disengaged positions, wherein an apparatus is driven when the clutch assembly is in the engaged position;
(b) a slave cylinder formed with a first fluid port and a second fluid port mounted adjacent to the clutch assembly;
(c) a piston movably mounted in the slave cylinder and moveable between retracted and extended positions for moving the clutch assembly between the engaged and disengaged positions, respectively;
(d) a master cylinder formed with a first fluid port and a second fluid port and having a plunger movably mounted therein;
(e) a first conduit extending between and flowingly connecting the second port of the master cylinder and the first port of the slave cylinder;
(f) a valve formed with a first fluid port and a second fluid port and being movable between open and closed positions;
(g) a second conduit extending between the second port of the slave cylinder and the first port of the valve;
(h) a third conduit extending between the second port of the valve and the first port of the master cylinder;
(i) manually actuated means operatively connected to the plunger of the master cylinder, for displacing a fluid between the master cylinder and the slave cylinder, wherein manual movement of the manually actuated means between a depressed position and a released position causes displacement of the fluid through the first conduit from the master cylinder into the slave cylinder and from the slave cylinder into the master cylinder, respectively, and corresponding extension and retraction of the piston for moving the clutch assembly between the disengaged and engaged positions; and (j) switch means electrically connected to the valve for automatically controlling movement of the valve between the open and closed positions, so that upon energizing the valve by the switch means when the fluid is present in the slave cylinder and the clutch assembly is disengaged, the valve is moved from the closed to the open position, and the fluid subsequently flows out of the slave cylinder, through the second conduit, the valve, and the third conduit, and into the master cylinder, thereby automatically relieving fluid pressure in the slave cylinder and causing the piston to retract, which in turn allows the clutch assembly to move to the engaged position, generally without blocking manual control of the clutch assembly by the manually actuated means.

6. The system defined in claim 5 in which the valve is an electromechanical valve; and in which the valve is normally closed in a direction of flow from the slave cylinder to the master cylinder.

7. The system defined in claim 5 in which the valve is a solenoid-operated, two-way, poppet-type valve.

8. The system defined in claim 5 in which the switch means is electrically connected to a brake system of the apparatus, so that upon actuation of the switch means the brake system is disengaged simultaneously with engagement of the clutch assembly.

9. The system defined in claim 5 in which the switch means is a push button-activated control device.

10. A clutch system for coupling an engine of a vehicle with the drive shaft of the vehicle including:
(a) a hydraulic clutch;
(b) a slave cylinder operatively connected to the clutch for controlling said clutch to engage and disengage the vehicle engine with and from the drive shaft;
(c) a manually actuated master cylinder hydraulically connected to the slave cylinder along a first hydraulic path for manually controlling the slave cylinder to manually control the engagement and disengagement of the clutch;
(d) a second hydraulic path between the manually actuated master cylinder and the slave cylinder;
(e) valve means in the second hydraulic path; and
(f) switch means for opening the valve means for a short duration of time sufficient to permit the flow of fluid from the slave cylinder along the second hydraulic path for automatically actuating the slave cylinder to actuate the hydraulic clutch and engage the engine with the drive shaft without loss of manual control of the master cylinder and hydraulic clutch along the first fluid path except for the duration of time when the valve means is opened.

11. The clutch system defined in claim 10 in which the switch means is connected to a brake system for the vehicle; and in which the brake system is actuated simultaneously with the actuating of the hydraulic clutch.

12. The clutch system defined in claim 10 in which the valve means is opened for approximately ½ seconds.

13. The clutch system defined in claim 10 in which the valve means is a solenoid actuated valve.

14. The clutch system defined in claim 10 in which a manually actuated arming switch is operatively connected to the switch means and valve means to prevent premature actuation of said switch means and valve means.

15. The clutch system defined in claim 10 in which a second switch means is operatively connected to the vehicle engine and the valve means for preventing actuation of the valve means until the engine has reached a predetermined speed.

* * * * *